United States Patent [19]

Hallstrom et al.

[11] Patent Number: 5,572,956
[45] Date of Patent: Nov. 12, 1996

[54] CYCLONE AFTER-BURNER FOR CYCLONE REBURN $NO_x$ REDUCTION

[75] Inventors: Joseph E. Hallstrom, Mogadore; Peter H. Schueler, Richfield, both of Ohio

[73] Assignee: The Babcock & Wilcox Company, New Orleans, La.

[21] Appl. No.: 549,140

[22] Filed: Oct. 27, 1995

[51] Int. Cl.⁶ ........................... F22B 37/10
[52] U.S. Cl. .................... 122/247; 431/160; 431/284; 110/210
[58] Field of Search ............... 431/9, 159, 160, 431/284; 110/210, 213, 260, 261, 262, 263; 122/6.5, 136 R, 250 R, 247

[56] References Cited

U.S. PATENT DOCUMENTS

| | | | |
|---|---|---|---|
| 2,485,656 | 10/1949 | Raskin | 158/1.5 |
| 2,546,937 | 3/1957 | Wyandt et al. | 266/34 |
| 3,408,167 | 8/1965 | Burden, Jr. | 23/277 |
| 4,147,116 | 4/1979 | Graybill | 110/263 |
| 4,253,403 | 3/1981 | Vatsky | 110/104 B |
| 4,556,384 | 12/1985 | Laurenceau et al. | 431/160 |
| 4,865,542 | 9/1989 | Hasenack et al. | 431/160 |
| 4,924,784 | 5/1990 | Lennon et al. | 110/261 |
| 5,014,631 | 5/1991 | Ikeda et al. | 110/264 |
| 5,022,329 | 6/1991 | Rackley et al. | 110/234 |
| 5,062,409 | 11/1991 | Kamanaka et al. | 126/99 |
| 5,193,490 | 3/1993 | Peruski | 122/4 D |
| 5,383,782 | 1/1995 | Yap | 432/22 |
| 5,403,181 | 4/1995 | Tanaka et al. | 431/8 |

OTHER PUBLICATIONS

Technical Paper: "Long Term $NO_x$ Emissions Results with Natural Gas Reburning on a Cyclone Fired Boiler"; R. W. Borio, R. D. Lewis, S. Durrani, A. Lookman; Oct. 1992.
Technical Paper: "Coal Reburning Technology for Reducing $NO_x$ in Cyclone Boilers"; A. S. Yagiela, G. J. Maringo, R. J. Newell, H. Farzau; Aug., 1992; pp. 1–13.
Technical Paper: "Update on Coal Reburning Technology for Reducing $NO_x$ in Cyclone Boilers"; A. S. Yagiela, G. J. Maringo, R. J. Newell, H. Farzan; Apr., 1991; pp. 1–11.
Technical Paper: "Pilot Evaluation of Reburning for Cyclone Boiler $NO_x$ Control"; H. Farzau, L. Rodgers, G. Maringo, A. Kokkinos, J. Pratapas; Mar., 1989; pp. 1–25.

Primary Examiner—Noah P. Kamen
Attorney, Agent, or Firm—Robert P. Bennett, Jr.; Robert J. Edwards

[57] ABSTRACT

A cyclone after-burner for cyclone reburn $NO_x$ reduction in a furnace has a retractable fuel pipe inside a lance extending along the cylindrical axis of the cyclone to a point near the re-entrant throat. The lance has a water-cooled jacket that is refractory covered to reduce heat absorption. The fuel pipe is adapted to provide gas, oil or pulverized coal for combustion in the furnace.

7 Claims, 2 Drawing Sheets

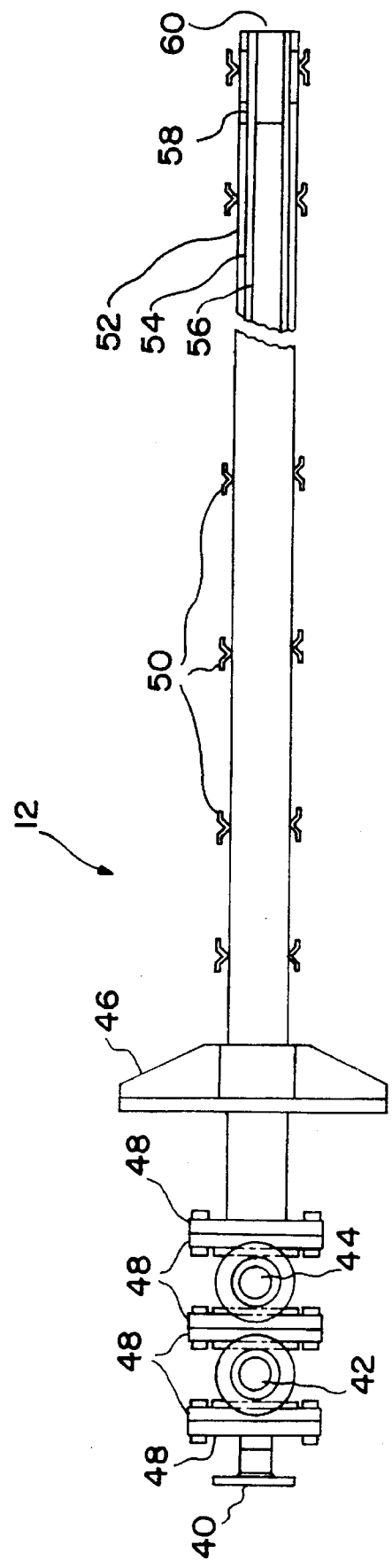

CYCLONE AFTER-BURNER FOR CYCLONE REBURN NO$_x$ REDUCTION

BACKGROUND OF THE INVENTION

1. Field of the Invention

The present invention relates to the field of burners and combustion systems, and more specifically, to reburning apparatus used in NO$_x$ reduction in cyclone fired boilers.

2. Description of the Related Art

NO$_x$ reduction in cyclone fired boilers using "reburning" is a technology that has been developing over the past several years. Starting with bench scale testing in the 1980's, the technology has progressed to the full scale demonstration stage with recent tests using pulverized coal and natural gas as reburn fuels. The current technology utilizes separate reburn fuel injection ports or burners to introduce the reburn fuel in the lower furnace region, along with a set of overfire air ports located in the mid to upper portion of the furnace to admit combustion air. The furnace region between the reburn fuel ports and the overfire air ports is the reburn zone where substoichiometric conditions reduce the NO$_x$ that is created in the cyclones to elemental Nitrogen.

U.S. Pat. No. 2,546,937 discloses a retractable lance for use in a steel furnace. The lance is disclosed as being retractably mounted through a wall of a furnace.

U.S. Pat. No. 2,485,656 discloses a hydroxilating fuel burner comprising a adjustable fuel injecting lance contained within a cyclone type furnace region with an adjustable shell around it. The outer shell around the lance is adjustable to constrain the airflow around and into the fuel injection area. The '656 patent is disclosed as being primarily an oil fuel gun for use in a furnace, however, the patent also disclosed its potential use for pulverized coal or natural gas.

U.S. Pat. No. 4,924,784 discloses a cooling water system for a fuel lance. The '784 patent teaches a jacket-cooled fuel pipe with separate cooling water sources for various parts of the fuel lance for use in a boiler.

In U.S. Pat. No. 5,022,329 a hazardous waste incinerator incorporating a conventional cyclone reburner is disclosed.

SUMMARY OF THE INVENTION

The principal object of this invention is to improve the characteristics of current reburn systems that are applied to cyclone fired boilers.

The present invention simultaneously improves reburn fuel mixing, minimizes the reburn fuel quantity, permits greater residence time for burnout, and achieves this at lower cost and equal flame safety.

A further object of the invention is to replace the reburn fuel ports or burners that are typically located in the lower furnace walls, with individual cyclone fuel injection lances, one lance per cyclone.

The present invention hereafter referred to as an after-burner has an outer water-cooled jacket with a retractable fuel pipe through the center. The after-burner is mounted on the cyclone's burner front and extends inside along the cylindrical axis to a point near the re-entry throat. The water-cooled jacket is refractory covered to reduce heat absorptions and to maintain fluid slag conditions on the perimeter of the after-burner. The fuel injection system would be designed to inject the desired reburn fuel which could be natural gas, fuel oil or pulverized coal.

It is an additional object of the invention to provide a cyclone furnace in which each after-burner is served by an external fuel supply and cooling water system with appropriate metering and controls.

An object of the invention is also to provide a cyclone furnace where flame safety considerations are accounted for by monitoring the cyclone itself because the after-burner uses the cyclone as an igniter.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a side plan view of the after-burner invention.

DESCRIPTION OF THE PREFERRED EMBODIMENTS

Figure 1:
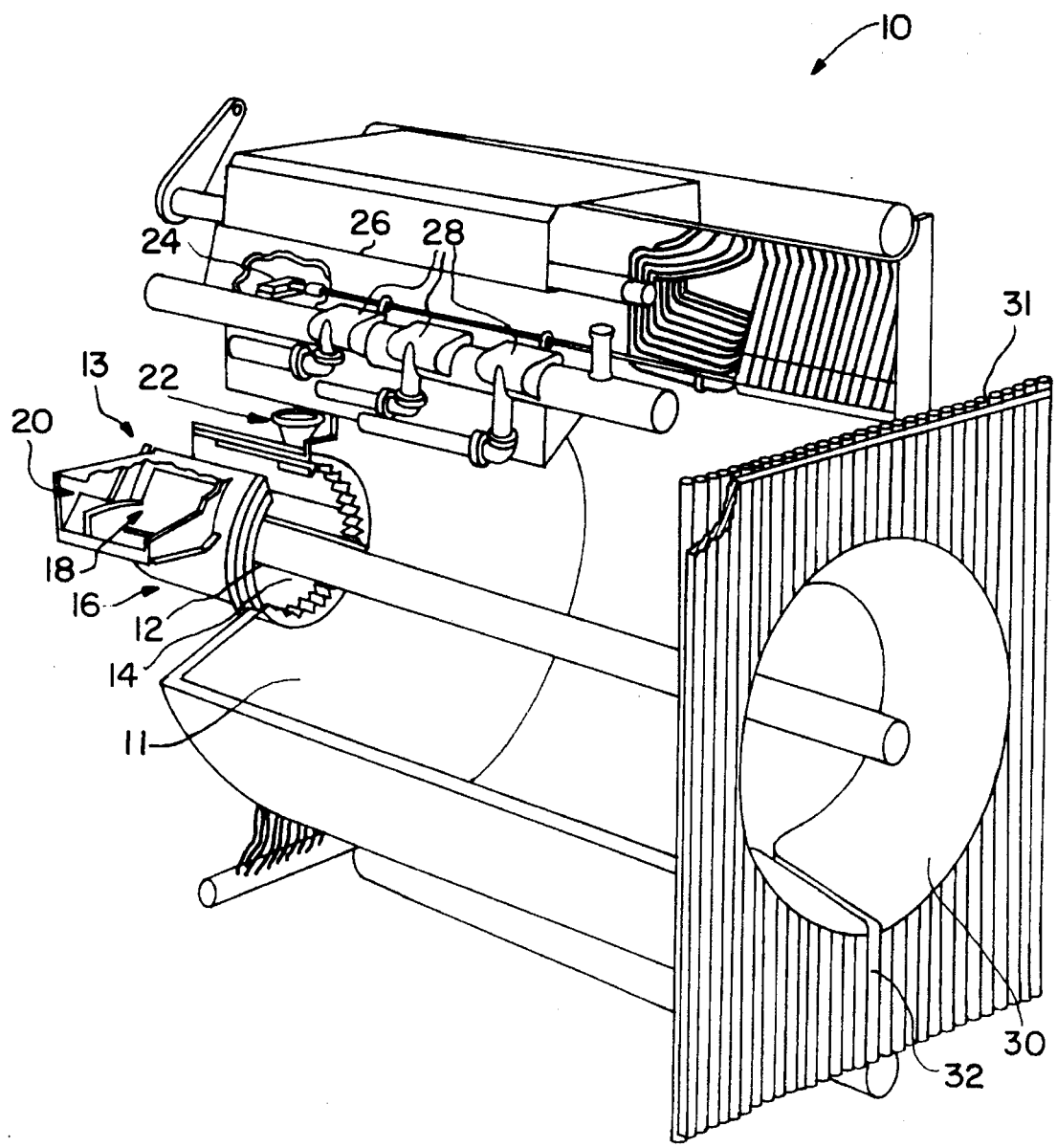
FIG. 1 is a cut-away perspective view of a cyclone furnace utilizing the present invention.

A cyclone furnace 10, as shown in FIG. 1, has an after-burner 12 extending longitudinally through an elongated cyclone chamber 11. The after-burner 12 extends through an opening 13 at one end of the cyclone chamber 11 and into the re-entrant throat 30 located on a side wall 31 of the furnace 10. The after-burner has a mounting plate 46, (shown in FIG. 2) attached to the walls of cyclone chamber 11 at opening 13 and making a seal therewith.

The cyclone furnace 10 has replaceable wear liner 14 on its inside and radial burner 16 located adjacent to the opening 13 of cyclone chamber 11. Primary air inlet 18 and tertiary air inlet 20 are provided at the radial burner 16. A crushed coal inlet 22 is located outside the cyclone chamber 11 for providing fuel to the cyclone chamber 11.

The cyclone furnace 10 may have one or more gas burners 28 and will have a secondary air inlet 26 to assist in the combustion in the cyclone chamber 11.

Further, there may be a coal deslagging oil burner 24 for preventing coal residue buildup inside the furnace which is attached to the cyclone furnace 10, outside of the cyclone chamber 11. Slag tap opening 32 is located on furnace sidewall 31, at the bottom of re-entrant throat 30. Slag tap opening 32 is used for draining residual coal from the cyclone chamber 11.

Turning now to FIG. 2, the various components of the after-burner 12 can be seen in more detail.

The after-burner 12 is made of several pipes of different diameter concentrically oriented about their longitudinal axes. The interior fuel pipe 56 is preferentially about 4 inches in diameter and is retractable through cooling-water tubing 54 and outer pipe 52 which surrounds fuel pipe 56 and tubing 54 along their entire length. Outer pipe 52 is preferentially about 8 inches in diameter. Cooling water tubing 54 defines a path in the gap between pipes 52, 56 which fills substantially all of the gap. The after-burner 12 has a gas inlet 40 at one end of the after-burner 12 and a gas outlet 60 at the outer end. Additionally, a slip joint 58 is provided near the gas outlet end of after-burner 12.

After-burner 12 has a mounting plate 46 for securely and tightly attaching the after-burner 12 to the cyclone chamber walls which define opening 13 of FIG. 1.

Located at the gas inlet 40 end of after-burner 12 are a series of flanges 48 used to connect cooling-water inlet 42 and cooling-water outlet 44 to the tubing 54 and the rest of the after-burner 12.

Additionally, refractory anchors 50 are provided outside along the length of outer pipe 52.

While a specific embodiment of the invention has been shown and described in detail to illustrate the application of the principles of the invention, it will be understood that the invention may be embodied otherwise without departing from such principles.

What is claimed is:

1. A cyclone after-burner for $NO_x$ reduction in a cyclone furnace having a primary air inlet, a secondary air inlet and at least one of a natural gas, oil and pulverized coal supply communicating with a cyclone chamber having a lance opening at a first end thereof, and a re-entrant throat opening at a second end thereof, the after-burner comprising:

a fuel injection lance extending through the lance opening substantially longitudinally through the cyclone chamber to the re-entrant throat opening;

means for mounting said fuel injection lance securely at the lance opening; and means for providing a fuel from the supply and primary air from the inlet to the fuel injection lance.

2. A cyclone after-burner according to claim 1, wherein the fuel comprises at least one of natural gas, oil or pulverized coal.

3. A cyclone after-burner according to claim 1, wherein the fuel injection lance further comprises means for cooling the lance with a coolant.

4. A cyclone after-burner according to claim 3, wherein the fuel injection lance comprises:

a first elongated pipe having a fuel inlet and a fuel outlet for carrying the fuel therethrough;

a second elongated pipe oriented substantially concentrically about a longitudinal axis of the first elongated pipe, having substantially the same length as the first elongated pipe and defining an annular gap therebetween.

5. A cyclone after-burner according to claim 4, wherein the means for cooling comprises:

a cooling-water inlet connected to the second elongated pipe outside the cyclone chamber;

a cooling tube located within the annular gap and connected at a water inlet end to the water inlet and connected at a water outlet end to a water outlet located on the second elongated pipe outside the cyclone chamber, said cooling tube defining a path filling substantially all of the cylindrical gap;

means for providing cooling water to the cooling water inlet; and means for removing cooling water at the cooling water outlet.

6. A cyclone after-burner according to claim 5, wherein the first elongated pipe is retractable through the cooling tube and second elongated pipe.

7. A cyclone after-burner according to claim 6, wherein the fuel comprises at least one of natural gas, oil and pulverized coal.

\* \* \* \* \*